(No Model.) 2 Sheets—Sheet 1.
J. C. WEAKLEY.
CULTIVATOR.
No. 550,146. Patented Nov. 19, 1895.
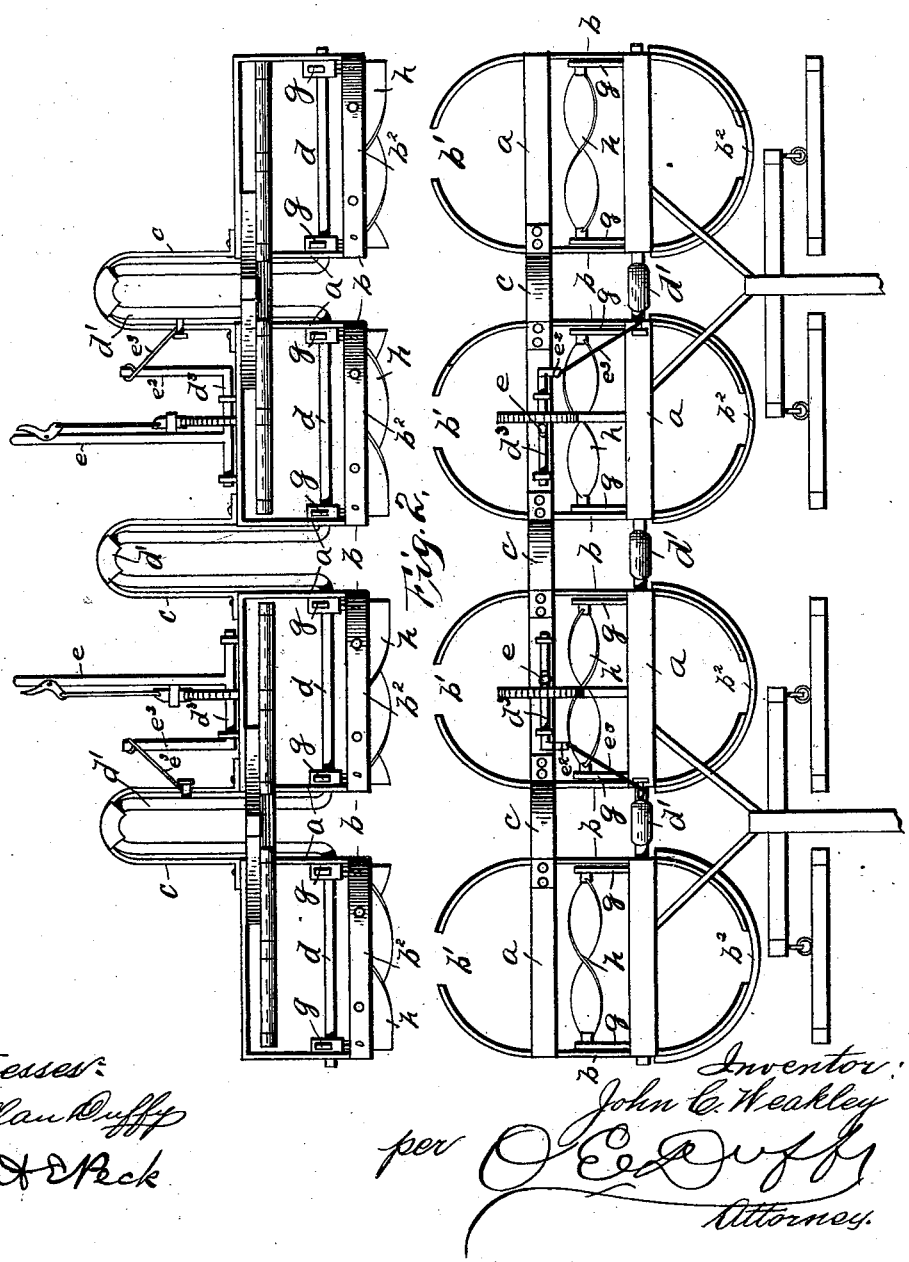

(No Model.) 2 Sheets—Sheet 2.
J. C. WEAKLEY.
CULTIVATOR.
No. 550,146. Patented Nov. 19, 1895.
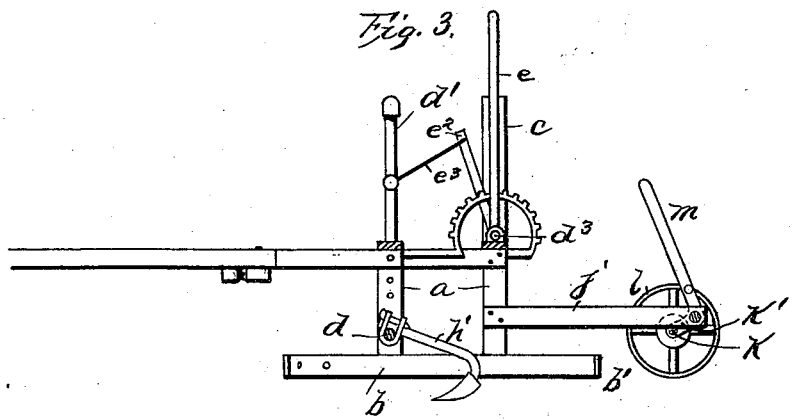
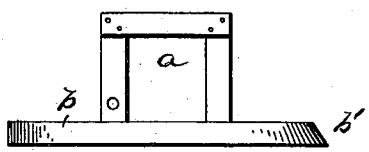
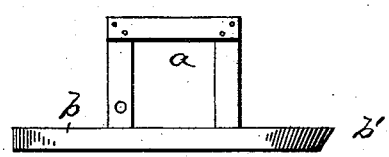
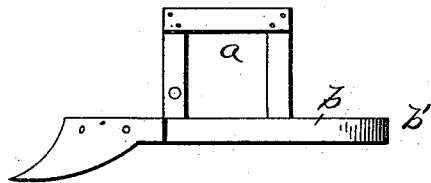
Witnesses:
E. Callan Duffy
Hubert Peck
Inventor:
John C. Weakley
per O. E. Duff
Attorney.

UNITED STATES PATENT OFFICE.

JOHN C. WEAKLEY, OF SLATE, KANSAS.

CULTIVATOR.

SPECIFICATION forming part of Letters Patent No. 550,146, dated November 19, 1895.

Application filed June 17, 1895. Serial No. 553,080. (No model.)

*To all whom it may concern:*

Be it known that I, JOHN C. WEAKLEY, of Slate, in the county of Rooks and State of Kansas, have invented certain new and useful Improvements in Cultivators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in cultivators.

The object of the invention is to provide an improvement in cultivators particularly adapted for working listed corn and which shall be simple, durable, and exceedingly effective in action, and which can be readily controlled and operated with a minimum amount of draft to accomplish the ends desired.

The invention consists in certain novel features of construction and in combinations and arrangements of parts more fully and particularly pointed out and described hereinafter.

Referring to the drawings, Figure 1 is a front elevation of a harrow constructed in accordance with my invention. Fig. 2 is a top plan view. Fig. 3 is a cross-sectional view through the central portion of a harrow, showing a trailing adjustable wheel-support, Figs. 4, 5, and 6 showing different forms of scrapers or horizontal cultivator-frames which can be employed.

A suitable number of harrow-sections can be employed to work the ground between the rows of corn and to throw the dirt toward the rows or from the rows to the centers of the spaces between the rows. Of course any desirable number of these sections can be employed. Although in the present instance I use four, I do not wish to limit myself to any number of sections.

The draft can be attached to the section in any suitable manner, so that the horse will travel between the rows, and of course the manner of attaching the draft will vary according to the number of sections employed in the harrow, and the draft device, as the tongue, can be adjusted so as to control the working depth of the harrow by means of raising or lowering the pivotal connecting point between the tongue or tongues and the harrow-frames.

Each section of the harrow preferably consists of the upright frame $a$, usually in the shape of an inverted U or arched somewhat, as shown, with the horizontally-arranged scraper $b$ secured to the lower ends of the frame and extending below the same. This scraper extends in front of the frame and from thence rearwardly on both sides of the frame, where it has the two inwardly-curved ends $b'$ extending toward each other, with the opening between rear ends in line with the center of a section. The front of the scraper in advance of the section is curved, and preferably continuous, although in some cases it can have the central opening in line with the rear central opening.

Each scraper is formed of sheet metal or the like arranged vertically or on edge, so that the flat face of the scraper travels forwardly against the earth and breaks up and separates the same, while the curved front ends of the scrapers throw the earth laterally toward the rows, and the rear ends of the scrapers form the earth into a central ridge between the rows.

In operation the earth piles up in front of the curved front ends of the harrow scrapers and falls over the same in a continuous stream. The one particular object of the particular form of scraper is to cultivate only the top portion of the soil, so that the soil will not be turned over and permitted to dry to a considerable depth. This is effectually avoided by the employment of my improved scraper arranged on edge, as described, and moving forwardly on the surface of the ground flatwise and being formed, comparatively, of narrow strips of sheet metal, the upper surface of the ground to a slight depth only being thus scraped, softened, and finally broken up.

Of course various forms of harrows can be employed if desired—as, for instance, in Fig. 1 I show each section having a divided scraper with the central openings and the front ends thereof provided with holes, so that a plate $b^2$ can be secured across the central opening, as shown, the scrapers with the front openings being usually employed to straddle the row, while in the drawings I show the sections arranged so as to travel between the rows.

The scrapers are removably secured to the lower ends and different kinds of scrapers can be employed if so desired, or the scrapers can be removed when desired for other reasons.

In Figs. 4 and 5 I show a removable and reversible scraper, the rear ends of which are twisted, so that when the scraper is adapted to position shown in Fig. 4 the said ends will throw the earth in toward the central opening, while when reversed to position shown in Fig. 5 the ends will permit the earth to slide over them without such a tendency to throw it in toward the corn.

In Fig. 6 the scraper is shown provided with a front plow or cutting-point arranged to cultivate the soil to a greater depth than the scraper itself and to cut off weeds, &c.

The sections can be secured together by any suitable means, as by the adjustable removable arches $c$ and the rock-shaft $d$, extending transversely across the lower front portions of and journaled in the harrow-sections, with the upwardly arched portions $d'$ between the sections.

Suitable levers $e$ can be mounted on the sections with proper racks and pawls and hand-clips to constitute locking means. Each lever being provided with a lateral arm $e^2$, to which the lever is secured by rock-shaft $d^3$, which is journaled on the top of the harrow-section, each lateral arm being loosely connected by link $e^3$ with one of the arched pawls of the rock-shaft, so that the rock-shaft can be easily locked by any one of said levers and locked in the desired position. This rock-shaft is provided to carry and move vertically suitable pulverizing or cultivating implements, such as a shovel, plow, or cultivator-tooth $h'$, as shown in Fig. 3, having their shanks detachably coupled to the rock-shaft and extending rearwardly therefrom beneath the rear sections and within the scraper thereof, so that the digging implements can be raised and lowered from the ground and its working depth controlled by the rock-shaft.

In some instances rearwardly-extending arms $g$ are rigidly secured to the rock-shaft between the scrapers and rotary cutters $h$ are journaled therein. Each cutter consists of a spiral cutting-blade, usually occupying the width of a harrow-section, and the cutter-blades of each section being usually twisted in an opposite direction, so as to throw the earth in opposite directions. These blades can be raised and lowered from the ground by the rock-shaft, and are rotated by engagement with the surface of the ground and are intended to pulverize and break up the earth and cut and destroy weeds.

$i$ indicates the draft-attaching device, which can be of any suitable and desired construction and attached to the harrow-frame in any suitable manner, although I prefer to attach them so as to be vertically adjustable and thereby control the working depth of the harrow, removable pivot-pins and a vertical series of holes in the front ends of the harrow-frames being there provided to permit vertical adjustment of the draft device.

If desired, the harrow can have a trailing-wheel support, as shown in Fig. 3, so that the harrow can be raised from the ground and supported on the wheels and the horses for transportation, or to permit easy turning or reversing. The device here shown for this purpose consists of a pair of rearwardly-extending arms $j$ and an axle $k$, mounted to turn in the ends of said arms with the cranked ends $k'$ on which the wheels $l$ are journaled, so that when the axle is rocked the wheels will be raised or lowered. The axle has a handle $m$ extending up therefrom, so that if the handle is forced down to horizontal position and against a suitable stop it will raise the central portion of the axle and thereby raise the harrow until the wheels pass under or beyond the axes of the upper portion of the axle and the wheel is thereby locked in its raised position until the handle is swung upward.

I do not limit myself to the particular construction of trailing-wheel supports shown, nor to the employment of any wheel-support; but merely illustrate and describe the same as an advantageous addition if desired for use. The rock-shaft can be formed in sections if desired, so that the harrow-sections can be easily separated or placed together when desired. The various rock-shaft sections can be united by sleeves or other suitable couplings at the tops of arched portions of the shaft.

Various varieties of soil-working implements can be employed with the scrapers if desired, although the device constitutes a most effective harrow where the peculiar scrapers alone are employed.

It is evident that various changes might be made in the forms, constructions, and arrangements of the parts without departing from the spirit and scope of my invention. Hence I do not wish to limit myself to the exact construction herein set forth.

What I claim is—

1. A cultivator comprising a frame having a scraper secured to the lower end thereof and extending in front of and to the rear of the frame and in a vertical position so as to present its broad side to the earth with its bottom edge scraping along or just beneath the surface of the ground, substantially as described.

2. A cultivator comprising a vertically extending frame having the scraper secured to its lower end and extending on both sides thereof and in front and behind the same, said scraper being continuous and rounded in front of the frame with the inturned ends behind the frame and composed of a strip of material on edge, substantially as described.

3. A listed corn cultivator comprising several sections coupled together each comprising an upright frame having scrapers secured around its lower end and extending in front and behind the same, substantially as described.

4. A harrow comprising the sections having the scrapers secured around their lower ends, the rock shaft extending through the sections, having the arched portions between the sections, rearwardly extending arms from the shaft carrying said working implements between the scrapers in the lower ends of the frame, and a lever on a frame provided with locking means and connected with one of the arches to rock the same, substantially as described.

5. A harrow having a rock shaft in the lower part of its frame, arms extending rearwardly from said shaft, and a spiral cutter at its ends mounted in the rear ends of said arms so as to be raised and lowered by the rock shaft, and lever connected with the rock shaft to control the same.

In testimony that I claim the foregoing as my own I affix my signature in presence of two witnesses.

JOHN C. WEAKLEY. [L. S.]

Witnesses:
O. E. DUFFY,
C. M. WERLE.